US009550536B2

(12) United States Patent
Johannsen et al.

(10) Patent No.: US 9,550,536 B2
(45) Date of Patent: Jan. 24, 2017

(54) IDLER GROUP AND METHOD OF ASSEMBLY

(71) Applicant: Caterpillar Inc., Peoria, IL (US)

(72) Inventors: Eric James Johannsen, Washington, IL (US); Michael Dean Hasselbusch, Metamora, IL (US); Timothy Richard Hoyt, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1060 days.

(21) Appl. No.: 13/677,549

(22) Filed: Nov. 15, 2012

(65) Prior Publication Data

US 2014/0132061 A1 May 15, 2014

(51) Int. Cl.
*B62D 55/14* (2006.01)

(52) U.S. Cl.
CPC ...................................... *B62D 55/14* (2013.01)

(58) Field of Classification Search
CPC ....... B62D 55/12; B62D 55/14; B62D 55/145; B62D 55/15; B62D 55/0966
USPC .......................................... 305/136, 137, 199
See application file for complete search history.

(56) References Cited

U.S. PATENT DOCUMENTS

| 3,744,860 | A | * | 7/1973 | Casey | 384/385 |
| 5,553,931 | A | * | 9/1996 | Diekevers | 305/100 |
| 6,186,511 | B1 | * | 2/2001 | Anderson et al. | 277/380 |
| 6,364,438 | B1 | | 4/2002 | Hasselbusch et al. | |
| 6,435,629 | B1 | | 8/2002 | Egle et al. | |
| 6,457,786 | B1 | | 10/2002 | Maguire | |
| 6,474,754 | B1 | * | 11/2002 | Hasselbusch | 305/136 |
| 7,644,999 | B2 | * | 1/2010 | Bradberry et al. | 305/136 |
| 8,590,987 | B2 | * | 11/2013 | Angot | B62D 55/32 305/137 |
| 8,690,534 | B1 | * | 4/2014 | Janocko et al. | 415/231 |
| 2005/0253453 | A1 | * | 11/2005 | Miller | B62D 55/0966 305/136 |
| 2006/0181149 | A1 | * | 8/2006 | Oertley | 305/136 |
| 2008/0141513 | A1 | * | 6/2008 | Livesay | 29/244 |

* cited by examiner

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

An idler group is disclosed for a mobile machine having a tracked undercarriage with an endless track. The idler group may include a retainer disposed on an axle and within an opening in an idler. The retainer may be configured to achieve an interference fit with the idler sufficient to hold the retainer within the opening of the idler during operation of the mobile machine. In another embodiment, a retaining ring may be disposed within a channel formed in the idler and may contact the retainer. In yet another embodiment, a swaged connection may be formed between the idler and the axle.

11 Claims, 4 Drawing Sheets

IDLER GROUP AND METHOD OF ASSEMBLY

TECHNICAL FIELD

The current disclosure relates generally to a mobile machine, and more particularly to an idler group and a method of assembling an idler group for a track-type mobile machine.

BACKGROUND

A mobile machine may be used to perform various types of work on different worksites, such as a construction site, a demolition site, a mining site, or a landfill site. For example, a bulldozer may be used to push soil and rock on a construction site. The bulldozer, as a track-type mobile machine, may include a tracked undercarriage with tracks on the left and right sides of the machine. Each of the tracks may include a chain formed by connecting a number of track links to one another, and connecting a number of track shoes to the chains. The tracks are supported by various roller assemblies on both sides of the machine, including idler groups that guide the tracks.

FIGS. 1 and 2 show an example of a known idler group 100. As illustrated in the drawings, idler group 100 includes an idler 102, which is typically formed of multiple components welded to one another. Idler 102 includes a rim 104 that is sized and shaped to engage and guide the track links. Idler group 100 also includes an axle 106, radial and thrust bearings 108 and 110 (only shown in FIG. 2), and end caps 112, among other components. Each end cap 112 is attached to idler 102 by multiple bolts 114, so that idler 102 is able to rotate on the bearings while being retained on axle 106.

Use of the known idler group results in numerous disadvantages, however. For example, assembly and disassembly of the idler group is labor intensive and expensive due to the number of bolts used to attach the end caps to the idler. Further, vibrations experienced by the idler group may result in the bolts loosening, so that the end caps are no longer reliably attached to the idler.

Thus, there exists a need for an improved idler group. The idler group and method of assembly in accordance with the current disclosure may overcome or avoid disadvantages resulting from the use of the above-described or other known idler groups.

SUMMARY

The current disclosure may provide an idler group for a mobile machine having a tracked undercarriage with an endless track. The idler group may include an idler configured to guide the endless track. An axle may be disposed through a central opening in the idler and configured to permit the idler to rotate relative to the axle. A retainer may be disposed on the axle and within an opening in the idler. The retainer may be configured to achieve an interference fit with the idler sufficient to hold the retainer within the opening of the idler during operation of the mobile machine.

The current disclosure may further provide an idler group for a mobile machine having a tracked undercarriage with an endless track. The idler group may include an idler configured to guide the endless track. An axle may be disposed through a central opening in the idler and configured to permit the idler to rotate relative to the axle. A retainer may be disposed on the axle and within an opening in the idler, the retainer configured to achieve an interference fit with the idler. A retaining ring may be disposed within a channel formed in the idler and may contact the retainer.

The current disclosure may still further provide an idler group for a mobile machine having a tracked undercarriage with an endless track. The idler group may include an idler configured to guide the endless track. An axle may be disposed through a central opening in the idler to permit the idler to rotate relative to the axle. A retainer may be disposed on the axle and within an opening in the idler, the retainer configured to achieve an interference fit with the idler. A swaged connection may be formed between the idler and the axle.

DETAILED DESCRIPTION

Figure 1:
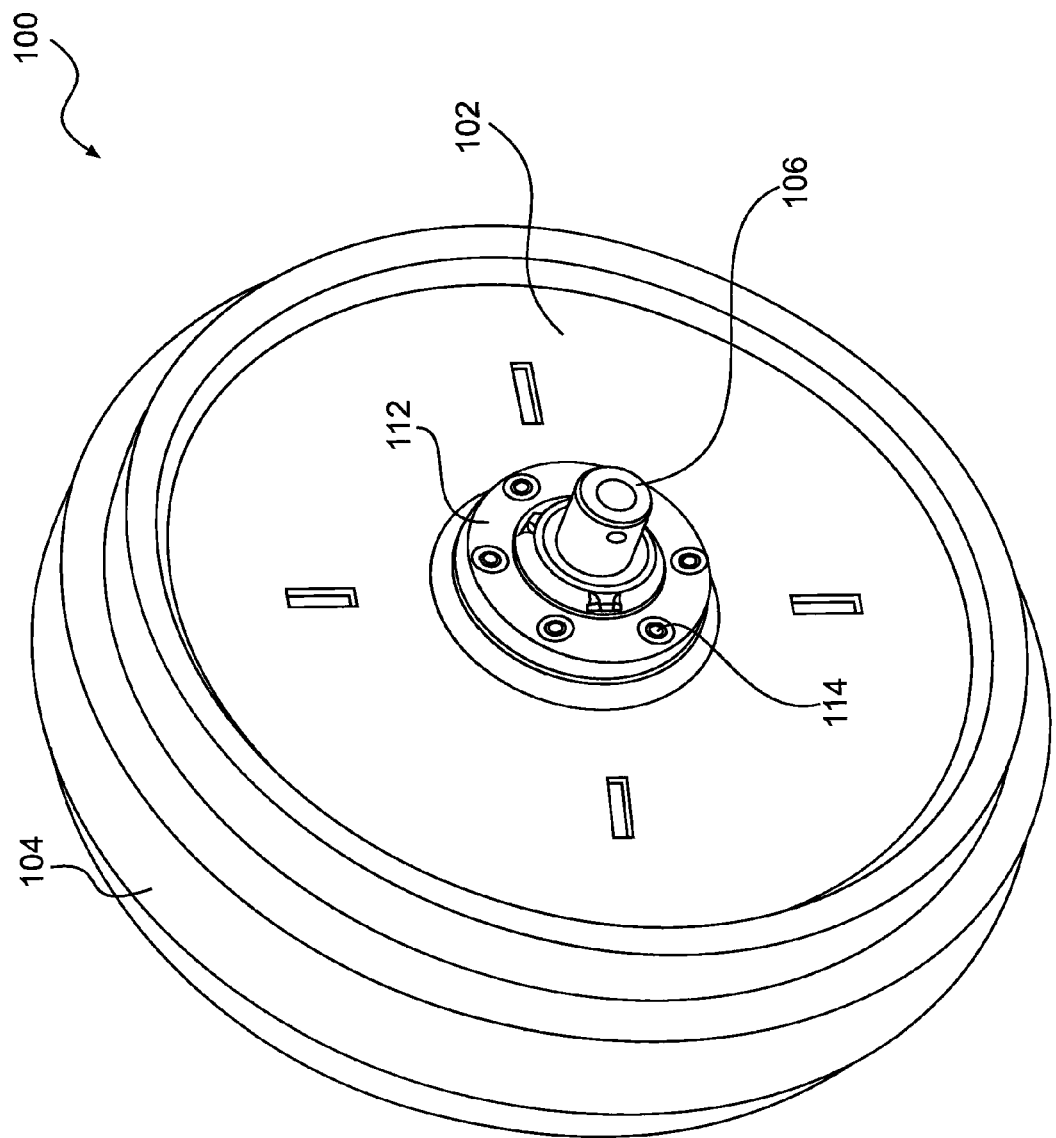
FIG. 1 illustrates an isometric view of a known idler group.
Figure 2:
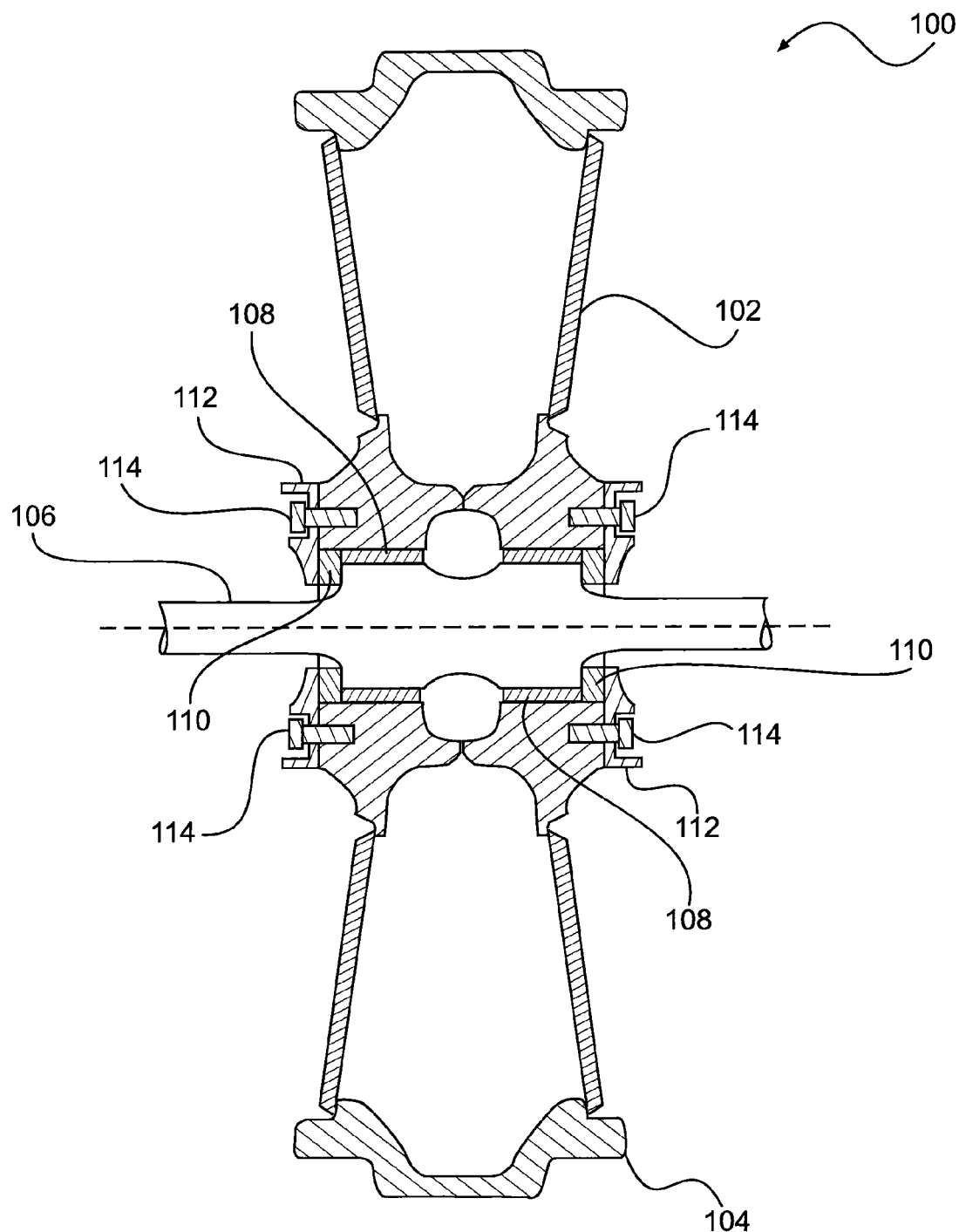
FIG. 2 illustrates a cross-sectional view of the known idler group of FIG. 1.
Figure 3:
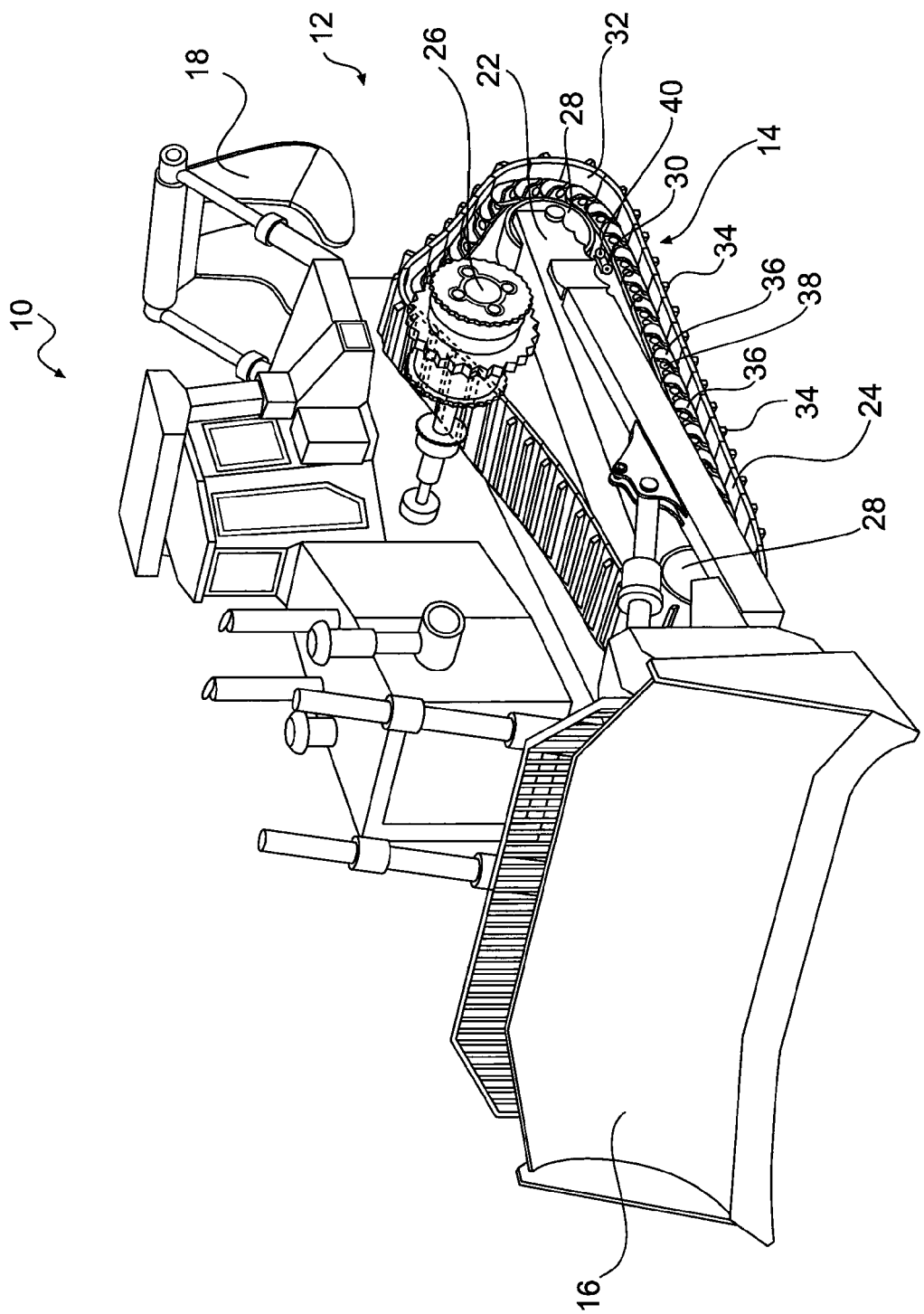
FIG. 3 illustrates an isometric view of a bulldozer including an idler group consistent with the disclosure.

FIG. 3 illustrates a mobile machine 10 with a chassis 12 having a tracked undercarriage 14, consistent with the disclosure. As shown in FIG. 3, machine 10 may be a bulldozer, and may include a blade 16 pivotally supported from chassis 12. Blade 16 may be configured to push, dig, pick up, transport, or otherwise move soil, rock, construction materials, debris, and the like on a worksite. Machine 10 may also include an implement 18, such as a ripper for breaking up the surface of the worksite. Machine 10 is not limited to being a bulldozer, however, but may be any machine that includes a tracked undercarriage. Further, whether or not machine 10 is a bulldozer, machine 10 is not limited to including either or both of blade 16 and implement 18, but instead may include other tools (e.g., a bucket, a shredder, etc.) or may entirely omit either or both of blade 16 and implement 18.

Tracked undercarriage 14 may be configured to support machine 10 and move the machine along the ground, roads, and/or other types of terrain. As shown in FIG. 3, undercarriage 14 may include a track roller frame 22, various guiding components connected to track roller frame 22, and an endless track 24 that engages the guiding components. The guiding components of the undercarriage 14 may include a drive sprocket 26, idler groups 28, and rollers 30, which are discussed in further detail below.

Track 24 may include a link assembly 32 that forms a flexible backbone of track 24, as well as a plurality of shoes 34 secured to link assembly 32. Link assembly 32 may include a plurality of links 36 connected to one another at pivot joints 38. In FIG. 3, only half of links 36 of link assembly 32 may be seen. For each link 36 visible in this figure, link assembly 32 includes a corresponding laterally spaced link 36. Link assembly 32 may form an endless chain that extends around and encircles drive sprocket 26, idler groups 28, and rollers 30, among other components. Shoes 34, which are configured to contact a ground surface underneath machine 10, may be secured to an outer perimeter of link assembly 32.

As shown in the configuration of FIG. 3, rollers 30 may be installed on the lower side of track roller frame 22 and thus may guide the lower portions of track 24. For example, each roller 30 may be rotationally supported on an axle 40 that is suspended below track roller frame 22. Rollers 30 may ride on and guide links 36 in the lower portion of the endless chain that is formed by link assembly 32. Although not included in the configuration shown in FIG. 3, rollers may be used to guide the upper portions of track 24. In such an arrangement, the rollers may be connected to the upper side of roller frame 22, such that links 36 in the upper portion of the endless chain ride on the rollers.

Drive sprocket 26 and idler groups 28 may also guide portions of track 24. Idler groups 28 may be connected to opposite ends of track roller frame 22, and drive sprocket 26 may be connected above roller frame 22 closer to one idler group 28 and a back end of machine 10. The endless chain formed by link assembly 32 may wrap around drive sprocket 26 and idler groups 28. One or more portions of drive sprocket 26 may project into spaces between laterally spaced pairs of links 36. As described in more detail below, one or more portions of each idler group 28 may project into spaces between laterally spaced pairs of links 36. Drive sprocket 26 and idler groups 28 may rotate about lateral axes to guide the ends of link assembly 32 through approximately semicircular paths between the lower and upper portions of the endless chain formed by link assembly 32. Additionally, because they extend into spaces between laterally spaced pairs of links 36, sprocket 26 and idler groups 28 may guide link assembly 32 in lateral directions. Sprocket 26 may be rotated by an external power source (not shown) of machine 10, such as an engine, to thereby move link assembly 32. Driven by sprocket 26, link assembly 32 may, in turn, rotate idler groups 28 as well as rollers 30 around their respective rotational axes. In the arrangement shown in FIG. 3, drive sprocket 26 is elevated above the ground at a height higher than that of each idler group 28, which are at a same height as one another. In alternate embodiments, however, drive sprocket 26 may be elevated at a height above the ground which is approximately the same as that of idler groups 28, or lower than that of idler groups 28. Further, although idler groups 28 are shown as being disposed at a same height above the ground, one idler group 28 may be disposed at a different height than one or more other idler groups 28.

Although FIG. 3 shows specific examples of components that may be included in machine 10 and in tracked undercarriage 14, idler groups 28 are not required to be used with a machine or undercarriage that includes any or all of these particular components. For example, idler group 28 may be used with a tracked undercarriage that includes more or fewer components, or other components, such as different numbers and/or types of rollers, as well as different types of track guiding mechanisms. Further, consistent with the disclosure, tracked undercarriage 14 is not required to include two idler groups 28 on each side of machine 10, but instead may include only one idler group 28 on each side.

Figure 4:
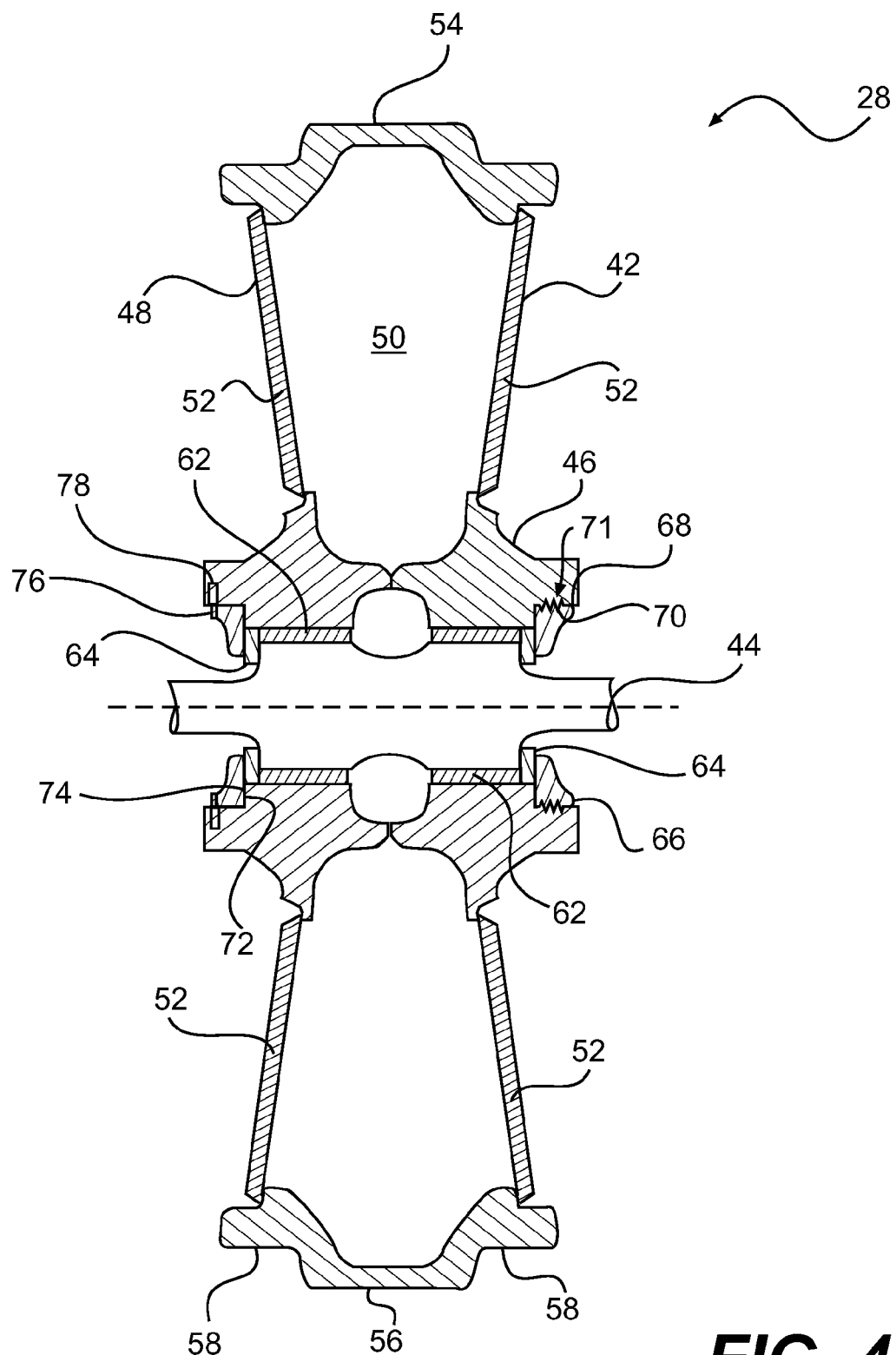
FIG. 4 illustrates a cross-sectional view of the idler group of FIG. 3.

FIG. 4 shows an exemplary embodiment of one idler group 28 from FIG. 3. As shown in FIG. 4, idler group 28 may include an idler 42 and an axle 44. Specifically, axle 44 may be disposed through a central opening of idler 42, so that idler 42 may rotate relative to axle 44. Idler 42 may be formed from a hub 46 that is connected to a body 48. Hub 46 may be constructed of two pieces that are connected to one another, such as by being welded together at a middle portion of each piece. Body 48 may be constructed so as to be hollow with a cavity 50 inside it. For example, body 48 may be formed from two side plates 52 and a rim 54. Each side plate 52 may be a frustoconical disc that is connected to hub 46, such as by being welded to hub 46. Side plates 52 may diverge away from one another as they extend radially outward from hub 46. Rim 54 may be connected to side plates 52, such as by welding. Rim 54 may be formed so as to include a center flange 56 that is flanked by a pair of tread shoulders 58. In operation, center flange 56 may be disposed between links 36 (shown in FIG. 3) of the endless chain, while tread shoulders 58 may ride directly on links 36. One or more of idler 42, axle 44, hub 46, and body 48 may be made of metal, such as high-carbon steel or another type of steel. Although FIG. 4 shows a specific example of idler 42, idler 42 is not limited to the specific configuration illustrated in the drawing. For example, idler 42 may be constructed of more or fewer parts, and the parts may be connected by processes other than welding. Consistent with the disclosure, idler 42 alternately may be constructed as a unitary component from a single piece of material, such that no joining of parts occurs during manufacture of idler 42, but instead idler 42 may be formed entirely by material removal and reshaping processes.

Idler group 28 may include radial and thrust bearings 62 and 64 that are disposed between axle 44 and idler 42. By this arrangement, idler 42 may be permitted to rotate on and relative to axle 44. Idler group 28 may further include a retainer 66 on each side thereof to form connections between retainers 66 and idler 42 on axle 44. Specifically, retainers 66 may be disposed on axle 44 and within openings in idler 42. Thus, retainers 66 may serve to locate and retain idler 42, as well as radial and thrust bearings 62 and 64, on axle 44. Each retainer 66 may be in the form of a ring, and may be sized and shaped to provide an interference fit between retainer 66 and idler 42. The interference fit may be sufficient to hold retainer 66 within idler 42 during operation of machine 10 on a worksite, without requiring the use of separate fasteners (e.g., bolts) to connect retainer 66 and idler 42. For example, retainer 66 may include an outer portion 68, which has an outer diameter slightly larger than a corresponding inner diameter of an inner portion 70 of idler 42. Outer portion 68 and inner portion 70 may be cylindrical surfaces and may extend in a direction approximately parallel to the rotational axis of axle 44.

Retainer 66 may also include a bottom portion 72 that is configured to contact a top portion 74 of idler 42. Each of bottom portion 72 and top portion 74 may be an approximately flat surface. By this arrangement, when bottom portion 72 contacts top portion 74, retainer 66 may be fully seated within idler 42. Bottom portion 72 and/or top portion 74 may extend in a direction that is approximately perpendicular to the rotational axis of axle 44, and thus may be approximately perpendicular to the direction in which outer portion 68 and inner portion 70 extend. Retainer 66 may be made of metal, such as high-carbon steel or another type of steel.

Consistent with the disclosure, retainer 66 is not limited to the specific form shown in FIG. 4. For example, retainer 66 may be shaped for easy insertion into or removal from idler 42. Retainer 66 also may have other surfaces, contours, openings, and the like, such as to locate or retain other components on axle 44 or within idler group 28 (e.g., to hold a fluid seal installed between idler 42 and retainer 66, such a seal being installed in channels formed in either or both of inner portion 70 of idler 42 or outer portion 68 of retainer 66). Retainer 66 may be formed from a single piece of material through material removal processes, or instead may be formed from multiple pieces that are connected to one another, such as by welding.

Although not required, one or more surfaces of retainer 66 and/or idler 42 may include elements that aid in the retention of retainer 66 within idler 42 by increasing the frictional force resulting from the interference fit therebetween. For example, either or both of outer portion 68 of retainer 66 and inner portion 70 of idler 42 may be at least partially textured, such as by knurling. This texturing may act to increase the frictional force between retainer 66 and idler 42, thereby providing a larger frictional force as compared to a similarly sized non-textured surface. Alternately or additionally, either or both of outer portion 68 of retainer 66 and inner portion 70 of idler 42 may be at least partially threaded, the threads cooperatively engaging one another. Cooperatively engaging threads 71 are illustrated diagrammatically in FIG. 4.

Optionally, idler group 28 may include a retaining ring 76 that aids in holding retainer 66 within idler 42. As shown in FIG. 4, retaining ring 76 may be disposed within a channel 78 that is formed in a portion of idler 42, such as within inner portion 70 of idler 42, and a surface of retaining ring 76 may be in contact with a portion of retainer 66. When retaining ring 76 is used, retainer 66 may still be held within the opening of idler 42 although the interference fit between idler 42 and retainer 66 may provide a lesser frictional force. For example, the difference between the outer diameter of outer portion 68 and the inner diameter of inner portion 70 may be smaller than compared to the configuration that does not use retaining ring 76. Thus, even if the interference fit between idler 42 and retainer 66 would not be sufficient by itself to hold retainer 66 within idler 42 during operation of machine 10 on a worksite, the addition of retaining ring 76 may be sufficient to hold retainer 66 within idler 42, thus resulting in an arrangement that may omit the use of other fasteners (e.g., bolts) connecting retainer 66 and idler 42. Retaining ring 76 may be formed from metal, such as steel. Although FIG. 4 shows a specific example of retaining ring 76, retaining ring 76 is not limited to the particular ring illustrated in the drawings, and may have a different shape, or may be formed from multiple components.

Also consistent with the disclosure, retainer 66 and idler 42 may be swaged together. Swaging may occur at a discrete number of positions (e.g., 4 positions, or 8 positions) along a circumference of an interface between retainer 66 and idler 42, or swaging may occur along approximately the entire circumference of the interface between retainer 66 and idler 42. The material of idler 42, retainer 66, and/or a different component may be swaged into one or more openings in idler 42 and/or retainer 66. When idler group 28 is swaged, retainer 66 may still be held within the opening of idler 42 although the interference fit between idler 42 and retainer 66 may provide a lesser frictional force. For example, the difference between the outer diameter of outer portion 68 and the inner diameter of inner portion 70 may be smaller than compared to the configuration that does not include a swaged connection. Thus, even if the interference fit between idler 42 and retainer 66 would not be sufficient by itself to hold retainer 66 within idler 42 during operation of machine 10 on a worksite, swaging idler 42 and retainer 66 may result in an arrangement that may omit the use of other fasteners (e.g., bolts) to connect retainer 66 with idler 42.

INDUSTRIAL APPLICABILITY

Thus, the foregoing description describes an exemplary configuration of idler group 28, including a connection between idler 42 and retainer 66, as well as an example of a particular machine 10 that may include idler group 28. However, idler group 28 is not limited to use in the particular machine shown in the drawings, but instead may be used with other various machines or structures.

Consistent with the disclosure, idler group 28 may include a connection between idler 42 and each retainer 66, such that idler 42 may be securely retained on axle 44. As a result of the interference fit between idler 42 and each retainer 66, whether with or without the use of retaining ring 76 or a swaged connection, each retainer 66 may be held in the opening of idler 42.

Thus, idler group 28 in accordance with the present disclosure provides numerous advantages compared to known idler groups. For example, idler group 28 does not require the use of multiple fasteners, such as bolts, which are required to connect both end caps to the idler in the known configuration. Rather, the interference fit between retainer 66 and idler 42 may be sufficient to maintain the connection therebetween during operation of machine 10 on a worksite. Therefore, the time and expense associated with installing multiple fasteners for each end cap are avoided. Further, attachment of retainer 66 to idler 42, when used with retaining ring 76, may require no specialized tooling such as an impact wrench and an associated air delivery system and related components (hoses, pressure regulators, etc.). Instead, retainer 66 may be inserted into retainer 42 by hand, and retaining ring 76 also may be installed by hand. Still further, when idler group 28 includes a swaged connection between idler 42 and retainer 66, the interference fit therebetween may be sufficient to securely hold retainer 66 in idler 42 during swaging, such that a precise connection may be formed between idler 62 and retainer 66.

It will be apparent to those skilled in the art that various modifications and variations may be made to the disclosed idler group. Other embodiments of the described idler group will be apparent to those skilled in the art from consideration of the specification and practice of the assembly and method disclosed herein. Thus, it is intended that the specification and examples be considered as non-limiting.

What is claimed is:

1. An idler group for a mobile machine having a tracked undercarriage with an endless track, the idler group comprising:
    an idler configured to guide the endless track;
    an axle disposed through a central opening in the idler and configured to permit the idler to rotate relative to the axle; and
    a retainer disposed on the axle and within an opening in the idler, the retainer configured to achieve an interference fit with the idler sufficient to hold the retainer within the opening of the idler during operation of the mobile machine;
    wherein the idler includes an inner surface having an inner diameter, the retainer includes an outer surface having an outer diameter greater than the inner diameter, both of the outer and inner surfaces including threads that cooperatively engage each other, and the outer and inner surfaces contact one another to achieve the interference fit when the retainer is disposed within the opening of the idler.

2. The idler group of claim 1, wherein at least one of the outer surface or the inner surface includes a textured surface.

3. The idler group of claim 1, further including:
    radial and thrust bearings disposed on the axle between the axle and the idler.

4. The idler group of claim 1, wherein the idler includes a top surface, the retainer includes a bottom surface, and the top and bottom surfaces contact each other when the retainer is disposed within the opening of the idler.

5. The idler group of claim 4, wherein the top and bottom surfaces are approximately flat planar surfaces extending in a direction approximately perpendicular to a rotational axis of the axle.

6. The idler group of claim 5, further including:
radial and thrust bearings disposed on the axle between the axle and the idler.

7. An idler group for a mobile machine having a tracked undercarriage with an endless track, the idler group comprising:
an idler configured to guide the endless track;
an axle disposed through a central opening in the idler and configured to permit the idler to rotate relative to the axle;
a retainer disposed on the axle and within an opening in the idler, the retainer configured to achieve an interference fit with the idler; and
a retaining ring disposed within a channel formed in the idler and contacting the retainer;
wherein the idler includes an inner surface having an inner diameter, the retainer includes an outer surface having an outer diameter greater than the inner diameter, both of the outer and inner surfaces include threads cooperatively engaging one another, and the outer and inner surfaces contact one another when the retainer is disposed within the opening in the idler.

8. The idler group of claim 7, wherein at least one of the outer surface or the inner surface includes a textured surface.

9. The idler group of claim 7, further including:
radial and thrust bearings disposed on the axle between the axle and the idler.

10. The idler group of claim 7, wherein the idler includes a top surface, the retainer includes a bottom surface, the top and bottom surfaces are approximately flat planar surfaces extending in a direction approximately perpendicular to a rotational axis of the axle, and the top and bottom surfaces contact one another when the retainer is disposed within the opening in the idler.

11. The idler group of claim 10, further including:
radial and thrust bearings disposed on the axle between the axle and the idler.

* * * * *